(12) United States Patent
Sun et al.

(10) Patent No.: US 10,397,197 B2
(45) Date of Patent: Aug. 27, 2019

(54) COEXISTENCE INTERFERENCE MITIGATION DURING WIRELESS LOCAL AREA NETWORK AUTHENTICATION

(71) Applicant: Apple Inc., Cupertino, CA (US)

(72) Inventors: Ye Sun, San Jose, CA (US); Camille Chen, Cupertino, CA (US); Guangquan Zhou, Palo Alto, CA (US); Hsin-Yao Chen, Castro Valley, CA (US); Siegfried Lehmann, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 15/479,195

(22) Filed: Apr. 4, 2017

(65) Prior Publication Data
US 2018/0084419 A1 Mar. 22, 2018

Related U.S. Application Data

(60) Provisional application No. 62/398,477, filed on Sep. 22, 2016, provisional application No. 62/398,479, filed on Sep. 22, 2016.

(51) Int. Cl.
*G06F 7/04* (2006.01)
*H04L 29/06* (2006.01)
(Continued)

(52) U.S. Cl.
CPC ............ *H04L 63/0428* (2013.01); *H04L 9/08* (2013.01); *H04W 4/21* (2018.02); *H04W 4/80* (2018.02);
(Continued)

(58) Field of Classification Search
CPC . H04L 2209/80; H04L 47/72; H04L 63/0428; H04L 9/08; H04W 12/04;
(Continued)

(56) References Cited

U.S. PATENT DOCUMENTS

| 8,249,031 | B1 * | 8/2012 | Hirsch | .............. | H04W 72/1215 370/336 |
| 8,335,206 | B1 * | 12/2012 | Hirsch | .............. | H04W 72/1215 370/349 |

(Continued)

*Primary Examiner* — Gary S Gracia
(74) *Attorney, Agent, or Firm* — Dickinson Wright RLLP (57) ABSTRACT

Methods and apparatuses for mitigating coexistence interference in a wireless device between a WLAN interface and a WPAN interface during a WLAN authentication process. The wireless device associates with a WLAN access point (AP), and after receiving a WLAN association response from the WLAN AP, the wireless device alternates between WLAN time periods, during which WLAN transmission is enabled and WPAN transmission is disabled, and WPAN time periods, during which WPAN transmission is enabled and WLAN transmission is disabled, during the WLAN authentication process. Durations of the WPAN time periods are based at least in part on a WPAN profile, e.g., a Bluetooth profile, in use by the wireless device. Durations of the WLAN time periods are based at least in part on receipt of WLAN authentication messages from the WLAN AP during the authentication process or expiration of WLAN authentication process timers.

20 Claims, 7 Drawing Sheets (51) Int. Cl.
*H04W 4/80* (2018.01)
*H04L 9/08* (2006.01)
*H04W 12/06* (2009.01)
*H04W 4/21* (2018.01)
*G06F 15/16* (2006.01)
*H04W 84/12* (2009.01)
*H04W 12/04* (2009.01)
*H04W 88/06* (2009.01)
*H04W 12/00* (2009.01)

(52) U.S. Cl.
CPC ......... *H04W 12/06* (2013.01); *H04L 2209/80* (2013.01); *H04W 12/00502* (2019.01); *H04W 12/04* (2013.01); *H04W 84/12* (2013.01); *H04W 88/06* (2013.01)

(58) Field of Classification Search
CPC ......... H04W 12/06; H04W 4/21; H04W 4/80; H04W 84/12; H04W 88/06
USPC ........ 455/41.2, 454; 370/329, 336; 380/270; 726/7
See application file for complete search history.

(56) References Cited

U.S. PATENT DOCUMENTS

| | | | |
|---|---|---|---|
| 8,902,923 | B2 | 12/2014 | Hiremath |
| 2004/0116075 | A1* | 6/2004 | Shoemake ............ H04W 28/10 455/41.2 |
| 2008/0130603 | A1* | 6/2008 | Wentink .............. H04W 74/085 370/338 |
| 2008/0205365 | A1* | 8/2008 | Russell ................ H04W 88/06 370/341 |
| 2008/0238807 | A1 | 10/2008 | Ibrahim et al. |
| 2008/0279138 | A1* | 11/2008 | Gonikberg ............ H04W 8/005 370/328 |
| 2008/0299987 | A1* | 12/2008 | Iyer ....................... H04W 16/10 455/454 |
| 2009/0285167 | A1 | 11/2009 | Hirsch et al. |
| 2009/0312010 | A1 | 12/2009 | Hall |
| 2012/0071185 | A1* | 3/2012 | Dayal ............... H04W 72/1215 455/509 |
| 2013/0260686 | A1* | 10/2013 | Mukherjee ........... G06F 9/5027 455/41.2 |
| 2015/0024687 | A1* | 1/2015 | Rawat ................... H04W 88/06 455/41.2 |
| 2015/0043493 | A1* | 2/2015 | Gajanan ................ H04W 16/14 370/329 |
| 2015/0092642 | A1 | 4/2015 | Geboff et al. |
| 2015/0319700 | A1 | 11/2015 | Oteri et al. |
| 2015/0358995 | A1 | 12/2015 | Li et al. |
| 2016/0086175 | A1* | 3/2016 | Finlow-Bates ....... H04L 9/3271 705/77 |
| 2016/0182469 | A1* | 6/2016 | Ahmed ............... H04L 63/0492 380/270 |
| 2017/0060645 | A1 | 3/2017 | Gasselin De Richebourg et al. |
| 2017/0126363 | A1 | 5/2017 | Wang et al. |
| 2018/0084558 | A1 | 3/2018 | Chen et al. |

* cited by examiner

COEXISTENCE INTERFERENCE MITIGATION DURING WIRELESS LOCAL AREA NETWORK AUTHENTICATION

CROSS-REFERENCE TO RELATED APPLICATIONS

This application claims the benefit of U.S. Provisional Patent Application No. 62/398,477, entitled "COEXISTENCE INTERFERENCE MITIGATION DURING WIRELESS LOCAL AREA NETWORK AUTHENTICATION," by Ye Sun et al., filed on Sep. 22, 2016, and the benefit of U.S. Provisional Patent Application No. 62/398,479, entitled "COEXISTENCE MANAGEMENT FOR MULTIPLE WIRELESS DEVICES BY A WIRELESS NETWORK DEVICE", by Camille Chen et al., filed on Sep. 22, 2016, the contents of both of which are incorporated by reference herein in their entirety for all purposes.

This application is related to U.S. patent application Ser. No. 15/479,191, entitled "COEXISTENCE MANAGEMENT FOR MULTIPLE WIRELESS DEVICES BY A WIRELESS NETWORK DEVICE", by Camille Chen et al., filed Apr. 4, 2017, the content of which is incorporated by reference herein in its entirety for all purposes.

FIELD

The described embodiments set forth methods and apparatus for mitigating coexistence interference in a wireless device, including to adjusting communication time periods for a wireless local area network (WLAN) interface and a wireless personal area network (WPAN) interface during WLAN authentication.

SUMMARY

The embodiments described herein set forth methods and apparatuses for mitigating coexistence interference in a wireless device between a WLAN interface and a WPAN interface during a WLAN authentication process. The wireless device associates with a WLAN access point (AP), and after receiving a WLAN association response from the WLAN AP and during the WLAN authentication process, the wireless device alternates between WLAN time periods, during which WLAN transmission is enabled and WPAN transmission is disabled, and WPAN time periods, during which WPAN transmission is enabled and WLAN transmission is disabled, during the WLAN authentication process. Durations of the WPAN time periods are based at least in part on a WPAN profile, e.g., a Bluetooth profile, in use by the wireless device. Durations of the WLAN time periods are based at least in part on receipt of WLAN authentication messages from the WLAN AP during the authentication process or expiration of WLAN authentication process timers. The WLAN authentication process can include a nonce and key exchange process as part of establishing an encrypted data connection between the wireless device and the WLAN AP in accordance with an 802.11 Wi-Fi wireless communication protocol. The WLAN time periods include durations between transmitting a message to the WLAN AP and receiving an associated response form the WLAN AP during the WLAN authentication process. The WPAN time periods include durations to accommodate data communication for a WPAN connection, such as to empty pending data buffers for the WPAN connection. These and other techniques are described further herein.

This Summary is provided only for purposes of summarizing some example embodiments so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details.

In other instances, well known process operations have not been described in detail in order to avoid unnecessarily obscuring the presently described embodiments. Other applications are possible, such that the following examples should not be taken as limiting.

Wireless devices incorporate multiple wireless communication technologies that provide communication over different wireless networks, e.g., Long Term Evolution (LTE) cellular technology for wireless wide area network (WWAN) communication, Wi-Fi technology for wireless local area network (WLAN) communication, and Bluetooth® for wireless personal area network (WPAN) communication. Communication by different wireless interfaces that use different wireless communication technologies can interfere with each other when using common, overlapping, and/or adjacent radio frequency bands. In some configurations, a WPAN interface and a WLAN interface can each use a common radio frequency band, such as the 2.4 GHz Industrial, Scientific, and Medical (ISM) radio frequency band. Extant coexistence algorithms to mitigate interference rely on, e.g., clear-to-send-to-self (CTS2Self) messages or power save (PS) modes, which can delay transmissions. Such coexistence algorithms are applicable for an existing WLAN connection but are not useful when establishing a WLAN connection where critical message exchanges with timeouts may be unable to complete with delayed transmissions. In addition, co-located wireless interfaces in the same wireless device can interfere with each other when transmissions by each wireless interface are asynchronous, independent, and at least partially overlapping in a combination of time and frequency with each other. As such, during critical connection establishment processes, including an authentication process during which a wireless device establishes a data encrypted connection with another wireless device, where messages must be exchanged within critical time limits, introducing variable length dedicated time periods for each wireless interface allows for both the connection establishment by one wireless interface and continued communication by another wireless interface in the wireless device.

As part of the IEEE 802.11i wireless communication protocol, Wi-Fi Protected Access II (WPA2) is a commonly used encryption protocol to ensure secure Wi-Fi communication in a Wi-Fi local area network. For users that seek to connect a wireless device as a Wi-Fi station (STA) to a Wi-Fi access point (AP) quickly, seamlessly, and securely, the wireless device, as a Wi-Fi STA, and the Wi-Fi AP must complete an authentication process, referred to as a four-way handshake, to exchange critical information to be used for subsequent secure encrypted data communication. Wi-Fi packets, which may also be referred to herein as data packets, data frames, messages, or data messages, are exchanged between the Wi-Fi STA and the Wi-Fi AP within timeout limits specified, e.g., in the 802.11i wireless communication protocol. When the authentication process is unable to complete, the Wi-Fi STA will be unable to connect with the Wi-Fi AP, resulting in an apparent denial of Wi-Fi service for the Wi-Fi STA by the Wi-Fi AP. In some cases, interference from communication by a co-located wireless interface of the wireless device can impede reception of one or more of the messages exchanged in the authentication process. For example, when a co-located Bluetooth wireless interface that shares the same radio frequency band as the Wi-Fi wireless interface is transmitting messages that overlap (at least partially) in time and/or frequency with the Wi-Fi messages associated with the authentication process, a likelihood of successful completion of the authentication process is greatly reduced. Persistent timeouts due to WPAN interference with the reception of WLAN messages for the WLAN authentication process can extend the time to complete, and/or result in failure to complete, establishment of a secure connection between the wireless device and the WLAN AP. Extant coexistence algorithms, such as Clear-to-send-to-self (CTS2Self) and power save (PS) frames will attempt to defer communication of the authentication messages, which prolongs the authentication process. In some cases, the WLAN AP may be unable to support the use of CTS2Self or PS frames during the authentication process.

In some instances, WLAN and WPAN connection establishment may occur in an overlapping manner. For example, when a wireless device attempts to connect with a wireless AP that is incorporated in a head end unit of a vehicle communication system used for navigation display and media playback, e.g., as part of a CarPlay® enabled application, initial information for establishing a connection is sent from the vehicle communication system to the wireless device using a WPAN connection, e.g., via a Bluetooth connection. The wireless device can receive information via the WPAN connection for establishing a subsequent WLAN connection, such as a Wi-Fi connection, with the wireless AP of the vehicle communication system. The wireless device can associate with the wireless AP and seek to establish a secure encrypted connection using an authentication process, such as a WPA2 four-way handshake. During the authentication process, messages exchanged between the wireless AP and the wireless device can be corrupted due to interference from simultaneously active WPAN connections, such as between the vehicle communication system and the wireless device, or another wireless device in the vicinity. Additionally or alternatively, active WPAN connections of the wireless device, such as with an accessory connected to the wireless device, can also interfere with reception of messages from the wireless AP at the wireless device. The head end unit of the vehicle communication system can include sufficient isolation between a WLAN wireless interface and a WPAN wireless interface, and thus coexistence interference at the head end unit may be at a level that does not disrupt communication on either interface. However, wireless devices that seek to establish a secure encrypted connection with the head end unit may include a more limited set of hardware having less isolation between wireless interfaces and/or shared hardware, such as antennas and/or receive signal chain components. To reduce interference during critical time periods of an authentication process for establishing a secure encrypted connection between the wireless device (as a WLAN STA) and, e.g., the head end unit (as a WLAN AP), communication can be divided into separate time periods for WLAN communication by the WLAN wireless interface and for WPAN communication by the WPAN wireless interface. By including both WLAN time periods to allow for WLAN message exchange and WPAN time periods to initiate a WPAN connection or to continue an existing WPAN connection, the WLAN connection establishment can be completed while reducing interruptions to WPAN communication.

To improve the reliability of WLAN communication during a WLAN authentication process, while also maintaining functional WPAN connection performance, communication via a common radio frequency band, such as the 2.4 GHz band, is divided into alternating WLAN time periods and WPAN time periods. During a WLAN time period, no WPAN transmission occurs between the wireless device and other WPAN associated devices, such as to the head end unit of the vehicle communication system or to accessories associated with the wireless device, thus reducing radio frequency interference in the common radio frequency band. In some instances, WPAN reception by the wireless device can occur during the WLAN time period; however a WPAN transmission (e.g., an ACK) cannot be sent until a subsequent WPAN time period. During a WPAN time period, no WLAN transmission occurs between the wireless device and other WLAN associated devices, such as to the head end unit of the vehicle communication system (or another wireless AP) to which the wireless device seeks to establish a secure encrypted connection. WLAN reception by the wireless device can occur during the WPAN time period. Durations of the WLAN time periods are based at least in part on reception of corresponding WLAN messages and/or associated timeouts as part of the authentication process. Durations of the WPAN time periods are based at least in part on a WPAN profile, e.g., a Bluetooth profile, in active use for a WPAN connection of the wireless device to another device.

In some embodiments, a four-way handshake authentication process between a wireless device as a WLAN STA and a WLAN AP includes, the wireless device initiating a WLAN time period after receipt of a WLAN association message from the WLAN AP, and during the WLAN time period WPAN transmissions are disabled, either entirely or partially to reduce coexistence interference into reception of WLAN authentication messages. After receipt of a first WLAN authentication message form the WLAN AP, the wireless device ends the WLAN time period and initiates a WPAN time period, and during the WPAN time period, WLAN transmissions by the wireless device can be disabled. The duration of the WPAN time period can be based at least in part on an active WPAN profile, such as a Bluetooth profile. The duration of the WPAN time period can also be set to not exceed a timeout for transmitting a second WLAN authentication message to the WLAN AP. Thus, the wireless device can end the WPAN time period in time to transmit the second WLAN authentication message to the WLAN AP before the WLAN AP would timeout, e.g., based on timers for the authentication process. After the WPAN time period, the wireless device initiates another WLAN time period when transmitting the second WLAN authentication message to the WLAN AP and awaits receipt of a third WLAN authentication message from the WLAN AP. When the third WLAN authentication message is received from the WLAN AP, the wireless device ends the WLAN time period and initiates another WPAN time period, after which the wireless device ends the WPAN time period and transmits a fourth WLAN authentication message to the WLAN AP to complete the four-way handshake authentication process, e.g., during a brief final WLAN time period. If the third WLAN authentication message is not received before an associated timeout occurs, the wireless device ends the WLAN time period, repeats another WPAN time period, to allow for WPAN communication, and subsequently repeats the WLAN time period by retransmitting the second WLAN authentication message to the WLAN AP and awaiting reception of the third WLAN authentication message from the WLAN AP. When the four-way handshake authentication process is complete, the wireless device can use both the WLAN interface and the WPAN interface, e.g., using one or more existing coexistence processes, such as CTS2Self and/or PS modes.

While the embodiment disclosed herein uses communication between a wireless device and a head end unit of a vehicle communication system as an example, the methods and apparatus disclosed herein can be used whenever there is communication between a WLAN AP and a WLAN STA during a WLAN authentication process, where the WLAN STA includes multiple wireless interfaces, including a WLAN interface and another wireless interface, through which coexistence interference can occur. By enforcing alternating time periods that restrict transmission by one or other of the wireless interfaces, reception of critical messages during the WLAN authentication process via a WLAN interface can occur within time limits as required by an underlying WLAN communication protocol, while also allowing for continued communication by a parallel wireless interface, such as a WPAN interface.

Accordingly, the foregoing approaches provide techniques for mitigating coexistence interference in a wireless device between a WLAN interface and a WPAN interface during a WLAN authentication process. A more detailed discussion of these techniques is set forth below and described in conjunction with FIGS. 1-7, which illustrate detailed diagrams of representative systems and methods that can be used to implement these techniques.

Figure 1:
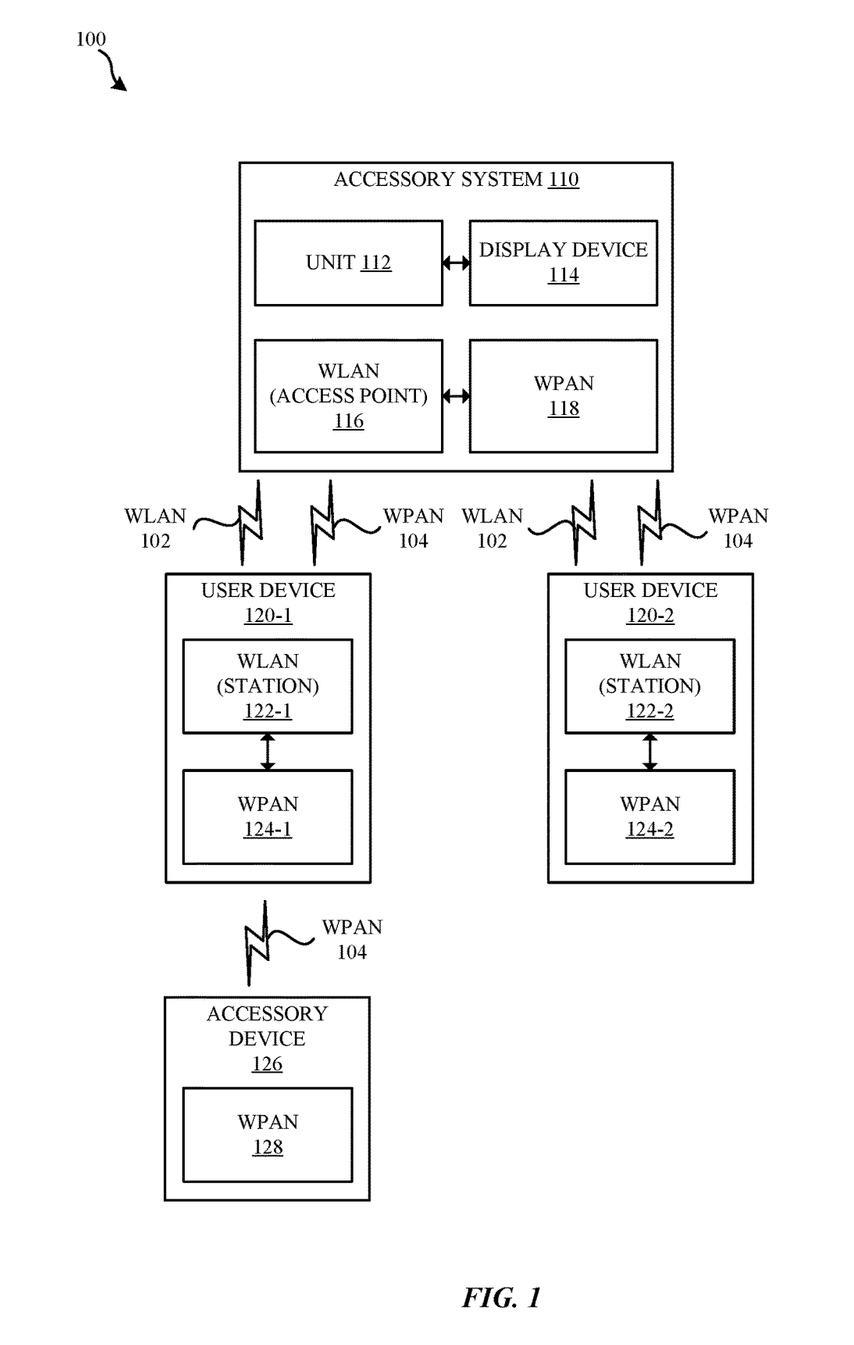
FIG. 1 illustrates a block diagram of different components of an example system configured to implement the various techniques described herein, according to some embodiments.

FIG. 1 illustrates a block diagram of different components of a system 100 that is configured to implement the various techniques described herein, according to some embodiments. FIG. 1 illustrates a high-level overview of the system 100, which includes an accessory system 110 (e.g., a CarPlay capable system) and one or more user devices 120. In other implementations, the accessory system 110 can be implemented as a different system or as, e.g., an access point. Each user device 120 can represent any form of a wireless device (e.g., smartphones, tablets, laptops, wearable devices, etc.) that is capable of interfacing with other wireless devices, such as with the accessory system 110. As shown in FIG. 1, the accessory system 110 represents a combination of hardware and software components that enable wireless communication sessions, including both WLAN connections and WPAN connections, to occur between the accessory system 110 and one or more of the user devices 120. The accessory system 110 can include a unit 112 that is communicatively coupled (directly or indirectly) to a display device 114, a WLAN unit 116, e.g., a Wi-Fi access point, and a WPAN unit 118, e.g., a Bluetooth® module, among other components. Similarly, each user device 120 can include a WLAN unit 122, e.g., to operate as a Wi-Fi station, a WPAN unit 124, e.g., a Bluetooth® module 124, and a display device (not shown), among other components. The user devices 120 can communicate with the accessory system 110 via wireless communication links, such as WLAN 102 connections and WPAN 104 connections, (e.g., over Bluetooth®, Wi-Fi, or Long Term Evolution in unlicensed spectrum (LTE-U)). It will be appreciated that while FIG. 1 depicts two user devices 120 capable of wirelessly connecting to the accessory system 110, any number of user devices 120 can be configured to wirelessly communicate with the accessory system 110 without departing from the scope of the disclosure. Moreover, while the techniques are described herein in terms of Bluetooth® and Wi-Fi connections, the same techniques can be applied to other combinations of wireless connections that can interfere with each other due to coexistence interference in the same, overlapping, and/or adjacent frequency bands. In some embodiments, establishing a secure WLAN connection between a user device 120 and the WLAN AP 116 can be divided into time periods alternating between WLAN transmissions between the user device 120 and the WLAN AP 116, and WPAN transmissions between the user device 120 and the WPAN unit 118 and/or an accessory device 126. WLAN 102 connections and WPAN 104 connections can operate in accordance with established WLAN and WPAN wireless communication protocols, such as those specified by the Institute of Electrical and Electronic Engineers (IEEE) 802.11 Wi-Fi and the Bluetooth Special Interest Group (SIG). The coexistence techniques described herein can be implemented in the example environment of FIG. 1, as well as in any other environments featuring both WLAN and WPAN communications.

Figure 2:
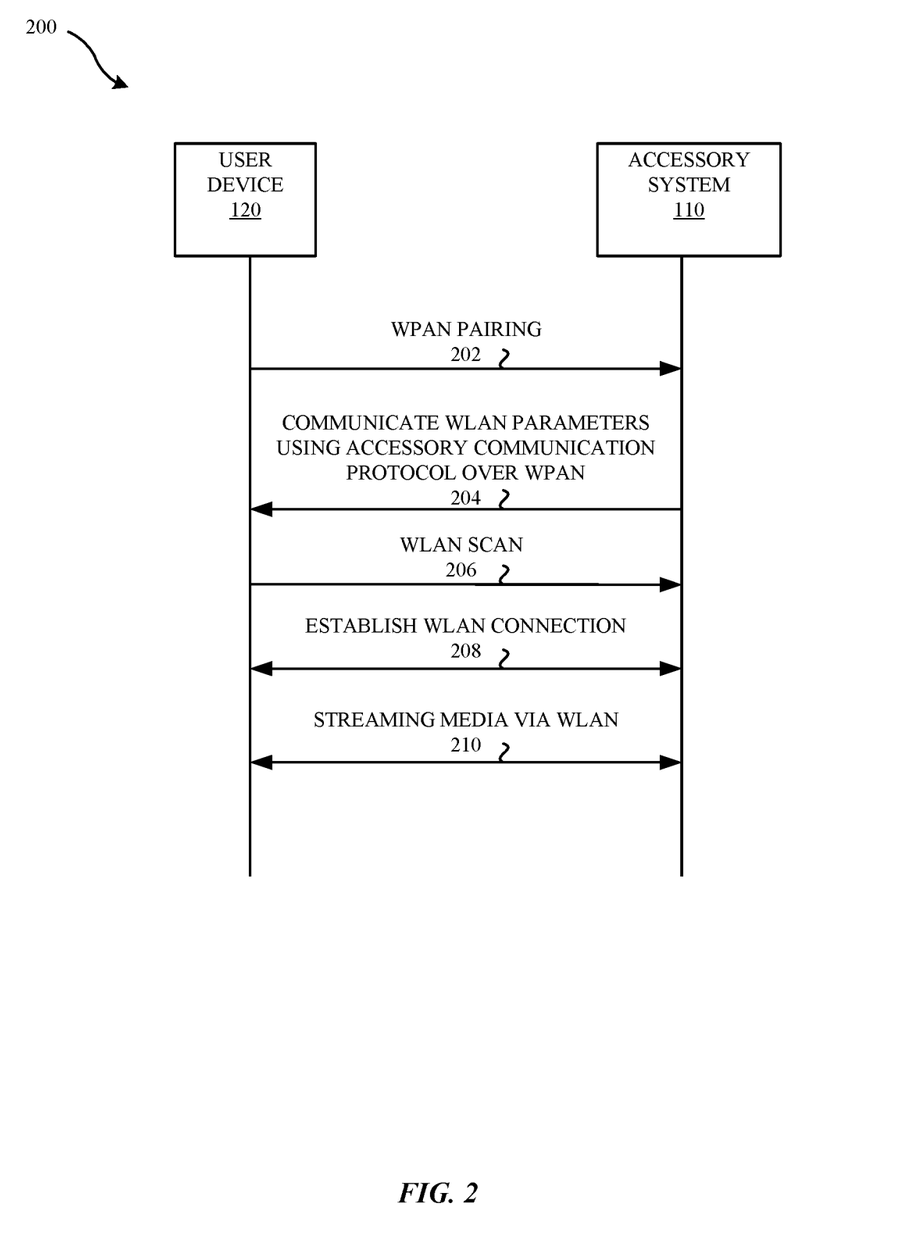
FIG. 2 illustrates a high-level sequence diagram of example operations performed in order to initiate a streaming session between a user device and an accessory system illustrated in FIG. 1, according to some embodiments.

FIG. 2 illustrates a high-level sequence diagram 200 of example operations performed in order to initiate a streaming media session between the user device 120 and the accessory system 110 of FIG. 1, according to some embodiments. As shown in FIG. 2, during an operation 202, the user device 120 initiates a WPAN, e.g., Bluetooth, pairing procedure with the accessory system 110 (e.g., using the WPAN unit 118 in the accessory system 110 and the WPAN unit 124 in the user device 120). When a secure WPAN link is established between the user device 120 and the accessory system 110, an operation 204 is carried out, where the accessory system 110 communicates with the user device 120 using, e.g., an accessory communication protocol (ACP) over the WPAN link. The ACP can include, for example, the iOS®-based Accessory Protocol (e.g., iAP2). During the operation 204, the accessory system 110 communicates, via the ACP to the user device 120, parameters associated with a WLAN network provided by the accessory system 110 (e.g., to connect with an use the WLAN access point 116). In turn, at operation 206, an in-car notification is triggered via the WPAN link, which causes the user device 120—specifically, the WLAN unit 122 included in the user device 120—to scan for the WLAN network provided by the accessory system 110. In summary, and in accordance with the foregoing operations, a low-bandwidth WPAN technology (e.g., Bluetooth) can be leveraged to provision the user device 120 with WLAN parameters and to initiate a WLAN scan for a WLAN network provided by the accessory system 110.

At an operation 208, the user device 120 establishes a WLAN connection with the accessory system 110 using the WLAN parameters received from the accessory system 110. As part of the WLAN connection establishment during operation 208, the user device 120 establishes a secure encrypted connection with the accessory system 110 (in particular the WLAN AP 116 thereof) using in part an authentication process, which includes a four-way handshake, as disclosed further herein. When the WLAN connection is established, a communication session, e.g., a media streaming session, between the user device 120 and the accessory system 110 can be initiated, which is reflected at the operation 210. Once the secure WLAN connection is established, the user device 120 can use both the WLAN connection and parallel WPAN connections, such as Bluetooth connections, in parallel.

Figure 3:
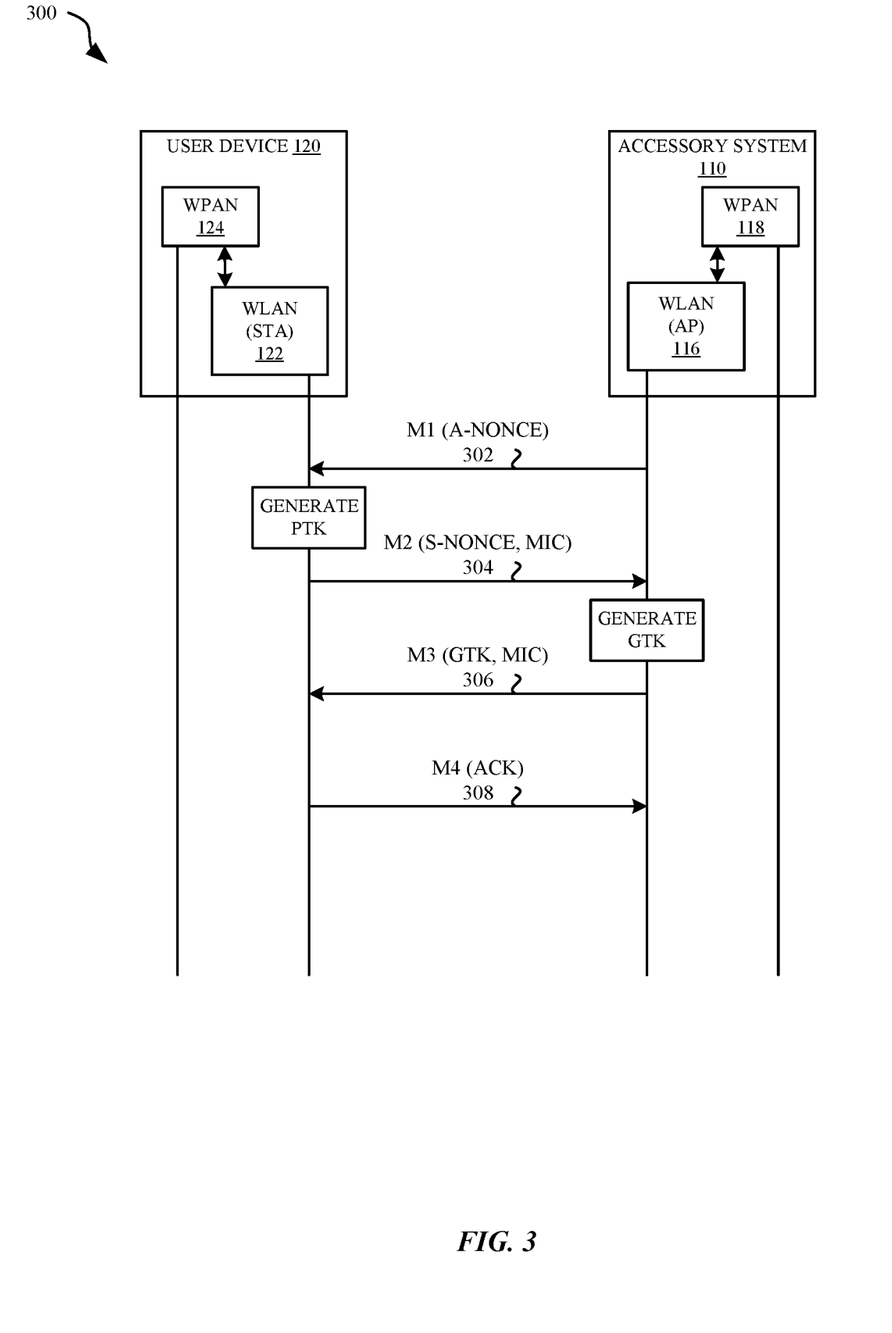
FIG. 3 illustrates a high-level sequence diagram of example operations performed during an authentication process between a user device and an accessory system, according to some embodiments.

FIG. 3 illustrates a sequence diagram 300 of a four-way handshake between the WLAN (STA) unit 122 of the user device 120 and the WLAN AP 116 of the accessory system 110. The four-way handshake illustrated in FIG. 3 can be part of an authentication process between the WLAN unit 122 of the user device 120 and the WLAN AP 116 of the accessory system 110 to establish a connection, e.g., a secure encrypted data connection, between them. At 302, the WLAN AP 116 can transmit a first WLAN authentication message labeled M1 to the WLAN STA unit 122 of the user device 120. The first WLAN authentication message M1 can include an AP nonce (a-nonce), which can be a single use, random (or pseudo-random) number generated by the WLAN AP 116. The WLAN STA unit 122 can use the content of the first WLAN authentication message M1, namely the a-nonce, to generate a pairwise transient key (PTK). The WLAN STA 122, at 304, transmits a second WLAN authentication message labeled M2 to the WLAN AP 116 in response to the first WLAN authentication message M1 received from the WLAN AP 116. The second WLAN authentication message M2 can include a STA nonce (s-nonce), which can be single use random (or pseudo-random) number generated by the WLAN STA 122, and the second WLAN authentication message M2 can also include a message integrity code (MIC), which can be generated by the WLAN STA 122 using the PTK, which was generated by the WLAN STA 122 based at least in part on the a-nonce of the first WLAN authentication message M1 received from the WLAN AP unit 116. The WLAN AP 116 can use the MIC of the second WLAN authentication message M2 to determine the validity of the second WLAN authentication message M2 received from the WLAN STA unit 122. The WLAN AP unit 116 can generate a group temporal key (GTK) based on the s-nonce received from the WLAN STA unit 122. The WLAN AP unit 116 at 306 can transmit a third WLAN authentication message labeled M3, which can include the GTK generated by the WLAN AP unit 116 and a second MIC, which can be generated by the WLAN AP unit 116 using the GTK. The WLA STA unit 122 can use the MIC of the third WLAN authentication message M3 to determine the validity of the third WLAN authentication message M3 received from the WLAN AP unit 116. The WLAN STA 122, at 308, can transmit a fourth WLAN authentication message labeled M4 to the WLAN AP unit 116. The fourth WLAN authentication message M4 can include an acknowledgement (ACK). With successful transmission, reception, and validation of the four WLAN authentication messages M1 to M4 with the exchange of keys, the WLAN STA 122 and the WLAN AP 116 can establish a connection, e.g., a secure encrypted data connection, between them. If one or more of the WLAN authentication messages of the four-way handshake is unable to be received properly, and when successive timeouts result and/or transmission retries fail, the authentication process may fail, and the WLAN STA unit 122 of the user device 120 may be unable to establish the connection with the WLAN AP unit 116. As discussed further herein, to improve the likelihood of successfully completing the authentication process, time periods for communicating WLAN authentication messages of the four-way handshake can be divided into alternating time periods for use of two different wireless interfaces that can otherwise interfere with each other, e.g., when sharing common, overlapping, and/or adjacent radio frequency bands. Furthermore, time periods for transmission/reception of the "M messages" associated with the four-way handshake can be protected against interference generated by another wireless interface.

Figure 4:
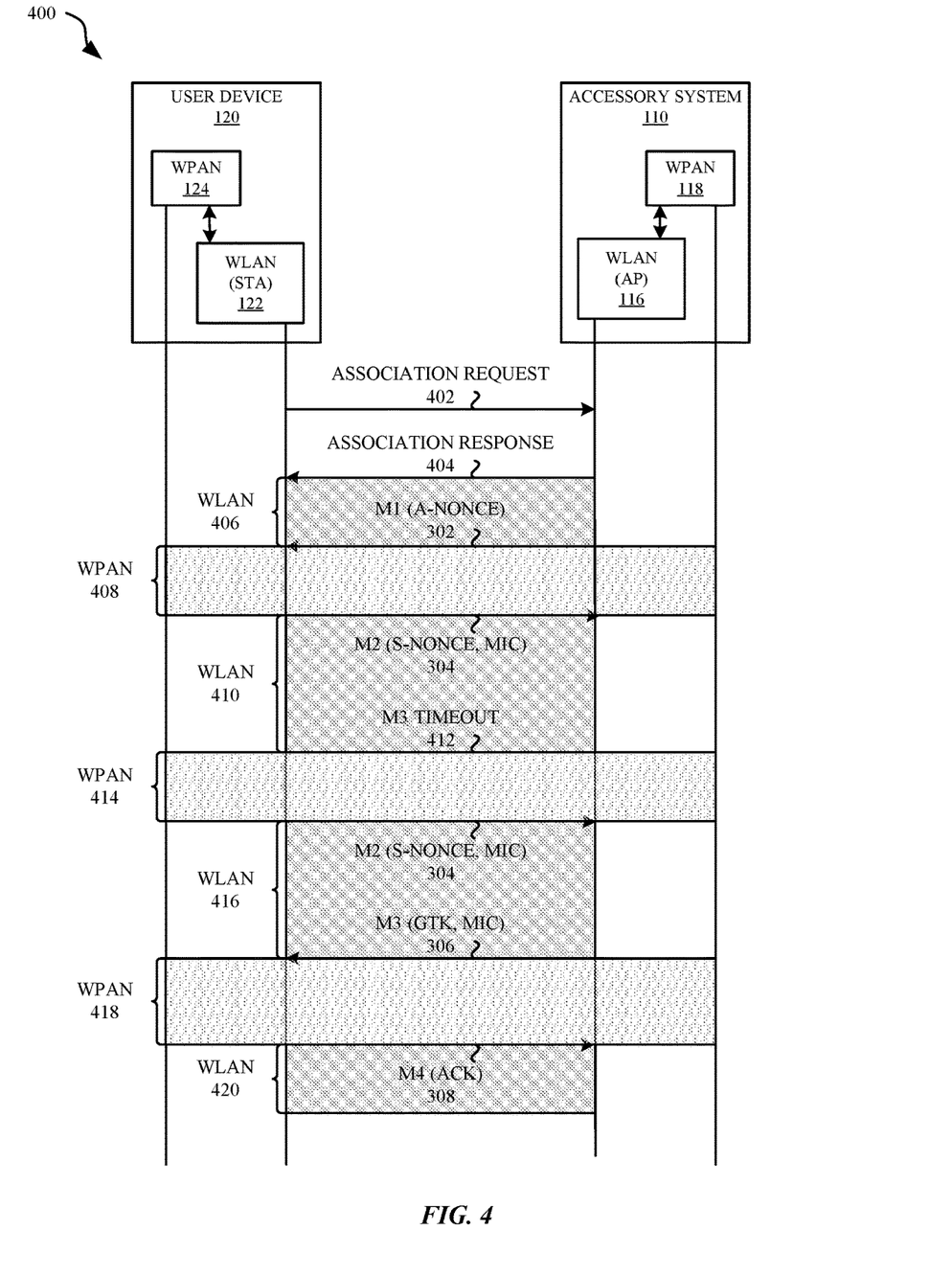
FIG. 4 illustrates a diagram of an exemplary sequence of actions including dedicated time periods for different wireless protocols during an authentication process between a user device and an accessory system, according to some embodiments.

FIG. 4 illustrates a diagram 400 of an exemplary sequence of actions including dedicated time periods for different wireless protocols during an authentication process between a user device 120 and an accessory system 110. Both the user device 120 and the accessory system 110 can include a WPAN unit 124 or 118 respectively. The WPAN unit 124 of the user device 120 can be communicatively coupled to the WLAN (STA) unit 122 of the user device 120. The WPAN unit 124 and the WLAN (STA) unit 122 of the user device 120, in some embodiments, can provide information to each other in order to facilitate coexistence with less interference of transmissions by one at least partially overlapping reception by the other. In some embodiments, the WPAN unit 124 and the WLAN (STA) unit 122 of the user device 120 are realized in a common integrated circuit (or system on a chip or other equivalent). Similarly, the WPAN unit 118 and the WLAN (AP) unit 116 of the accessory system can be communicatively coupled and allow for communication of information between them to facilitate coexistence with less interference between them.

As discussed herein, establishing a connection between the WLAN (STA) unit 122 of the user device 120 with the WLAN AP 116 of the accessory system 110 can include a four-way handshake authentication process that can be preceded by an association exchange. At 402, the WLAN STA unit 122 of the user device can transmit an association request to the WLAN AP 116 of the accessory system 110. At 404, the WLAN AP 116 can respond by transmitting an association response to the WLAN STA unit 122. Following this initial association, the authentication process can start. In order for the WLAN STA unit 122 of the user device 120 to receive the first WLAN authentication message M1 of the four-way handshake authentication process, after receiving the association response 404, the WLAN STA unit 122 can initiate a WLAN time period 406 during which transmissions by the WPAN unit 124 of the user device 120 can be disabled, either entirely or at least partially. The WLAN STA unit 122 can provide an indication to the WPAN unit 124 of the start of the WLAN time period 406. During the WLAN time period 406, the WPAN unit 124 of the user device 120 will not transmit to another wireless device, e.g., to the WPAN unit 118 of the accessory system 110 or to a WPAN unit 128 of an accessory device 126 (not shown) to allow for reception of the first WLAN authentication message M1 from the WLAN AP unit 116 of the accessory system 110. During the WLAN time period 406, in some embodiments, reception by the WPAN unit 128 can occur based on best effort. During the WLAN time period 406, in some embodiments, portions of shared wireless circuitry of the user device 120, such as a shared antenna and/or portions of a shared receive signal chain, such as a shared low noise amplifier, can be dedicated for use by the WLAN STA unit 122. The WLAN time period 406 can end, at 302, when the WLAN STA unit 122 of the user device 120 receives the first WLAN authentication message M1 from the WLAN AP unit 116 of the accessory system 110. The WLAN STA unit 122 can provide an indication to the WPAN unit 124 of the end of the WLAN time period 406, which can also serve as an indication to the WPAN unit 124 of the start of a subsequent WPAN time period 408. In other embodiments, the WLAN STA unit 122 can receive the first WLAN authentication message M1 from the WLAN AP unit 116 at any time during the WLAN time period 406, and the WLAN time period 406 can be terminated by an indication to the WPAN unit 124 or allowed to expire, e.g., based on passing of a predetermined duration of WLAN time period 406.

After reception of the first WLAN authentication message M1, the WPAN time period 408 can be initiated. During the WPAN time period 408, the WLAN STA unit 122 of the user device 120 does not transmit to the WLAN AP 116. During the WPAN time period 408, in some embodiments, the WLAN STA unit 122 of the user device 120 can receive messages (or other WLAN signals) based on best effort. A duration of the WPAN time period 408 can be based at least in part on an active WPAN profile in use by the WPAN unit 124, e.g., a particular Bluetooth profile in use. The duration of the WPAN time period 408 can also be based at least in part on a timeout timer for transmitting the second WLAN authentication message M2 to the WLAN AP unit 116 of the accessory system. In some implementations, the duration of the WPAN time period 408 can be based on a combination of factors, including any/all of a timeout for transmitting the M2 message to the WLAN AP unit 116, a WPAN profile in use, and the amount/importance of any pending WPAN messages. In order for the WLAN AP unit 116 to receive the second WLAN authentication message M2 and not time out, the WLAN STA unit 122 of the user device 120 can limit the duration of the WPAN time period 408.

In some embodiments, the active WPAN profile in use by the WPAN unit 124 can include a Bluetooth Asynchronous Connectionless Link (ACL) profile for a WPAN connection between the WPAN unit 124 and another wireless device, e.g., with the WPAN unit 118 of the accessory system 110 or with the WPAN unit 128 of the accessory device 126 (as shown in FIG. 1). The duration of the WPAN time period 408 can be based on an expected amount of time required to service the active WPAN profile, such as the Bluetooth ACL profile. In some embodiments, when the active WPAN profile is the Bluetooth ACL profile, the duration of the WPAN time period 408 can be approximately 20 to 30 milliseconds. In some embodiments, the duration of the WPAN time period 408 can terminate when the WPAN connection using the Bluetooth ACL profile is idle (e.g., not transmitting or transmitting any messages) for several contiguous Bluetooth time slots, where each BT time slot can span 625 microseconds.

In some embodiments, when the active WPAN profile is a Bluetooth Advanced Audio Distribution Profile (A2DP), the duration of the WPAN time period 408 can terminate after all pending transmission data buffers are emptied, although also not extending longer than a time period that would result in a timer expiring indicating timeout for reception of the second WLAN authentication message M2 by the WLAN AP unit 116. Thus, the WLAN STA unit 122 can extend the duration of the WPAN time period 408 to accommodate clearing WPAN buffers when the active WPAN profile is a Bluetooth A2DP, while also limiting the duration of the WPAN time period 408 to allow for transmission of the second WLAN authentication message M2 by the WLAN STA unit 122 to the WLAN AP 116 without incurring a timeout at the WLAN AP 116 for reception of the second WLAN authentication message M2. As shown in FIG. 4, the duration of the WLAN time period 408 extends from just after reception of the first WLAN authentication message M1 from the WLAN AP 116 to just before transmission of the second WLAN authentication message M2 in response to the WLAN AP 116. The WLAN AP 116 can initiate a timeout timer after transmission of the first WLAN authentication message M1 to monitor time for reception of the second WLAN authentication message M2.

In some embodiments, when the active WPAN profile is a Bluetooth Synchronous Connection Oriented (SCO) profile, an extended SCO (eSCO) profile, or a low power SNIFF mode, the duration of the WPAN time period 408 can be based at least in part on a time to complete an associated SCO/eSCO/SNIFF action, such as extending the WPAN time period 408 at least until the next SCO/eSCO/SNIFF instant is complete.

After termination of the WPAN time period 408, the WLAN STA unit 122 of the user device initiates a second WLAN time period 410 and transmits the second WLAN authentication message M2 to the WLAN AP 116 of the accessory system 110. As shown in FIG. 4, the duration of the second WLAN time period 410 can depend on reception of the third WLAN authentication message by the WLAN STA unit 122 from the WLAN AP 116. During the second WLAN time period 410, the WPAN unit 124 of the user device 120 can be precluded from transmitting WPAN transmissions, as also discussed for the first WLAN time period 406. In some embodiments, the WLAN STA unit 122 of the user device 120 initiates a timeout timer after transmitting the second WLAN authentication message M2 to the WLAN AP 116. If the timeout timer expires before receiving the third WLAN authentication message M3 from the WLAN AP 116, at 412, the WLAN STA unit 122 of the user device 120 can terminate the WLAN time period 410 and restart another WPAN time period 414. A timeout for reception of the third WLAN authentication message M3 is illustrated, but the third WLAN authentication message M3 may be received in other instances.

By limiting the duration of the WLAN time period 410, the WLAN STA unit 122 can ensure the WPAN unit 124 is not stalled for too long. In response to, e.g., expiration of the time period for receiving the third WLAN authentication message M3, the WLAN STA unit 122 can provide an indication of the end of the WLAN timer period 410 and the start of the subsequent WPAN time period 414 to the WPAN unit 124. The duration of the WPAN time period 414 can be based at least in part on one or more active WPAN profiles as discussed for the WPAN time period 408. As with the WPAN time period 408, in some embodiments, the WPAN unit 124 can provide an indication to the WLAN STA 122 when the WPAN time period 414 ends.

After termination of the subsequent WPAN time period 414, the WLAN STA unit 122 can initiate another WLAN time period 416 and retransmit the second WLAN authentication message M2 to the WLAN AP 116. After transmitting the second WLAN authentication message M2 to the WLAN AP 116, the WLAN STA unit 122 can continue the WLAN time period 416, during which WPAN transmissions by the WPAN unit 124 can be precluded, in order to receive the third WLAN authentication message M3 from the WLAN AP 116, reducing interference that otherwise may result from the WPAN unit 124. The duration of the WLAN time period 416 can end upon reception of the third WLAN authentication message M3 from the WLAN AP 116, at 306, or upon expiration of a timeout timer, e.g., when the third WLAN authentication message M3 is not received from the WLAN AP 116, as shown at 412 previously. The WLAN STA unit 122 can repeat alternating between WPAN time periods 408/414 and WLAN time periods 410/416 until reception of the third WLAN authentication message M3 at 306, or up to a maximum threshold number of retries.

Upon reception of the third WLAN authentication message M3 form the WLAN AP 116, at 306, the WLAN STA unit 122 can terminate the WLAN time period 416 and initiate another WPAN time period 418. The WLAN STA unit 122 can provide an indication of the termination of the WLAN time period 416 and/or of the initiation of the WPAN time period 418 to the WPAN unit 124. As discussed previously for WPAN time periods 408 and 414, the duration of the WPAN time period 418 can be based on one or more active WPAN profiles at the WPAN unit 124. Additionally, the duration of the WPAN time period 418 can be limited to allow for transmitting the fourth WLAN authentication message M4 to the WLAN AP 116.

The WPAN unit 124 can provide an indication of the termination of the WPAN time period 418 to the WLAN STA unit 122. The WLAN STA unit 122 can also maintain a timeout timer to ensure the WPAN time period 418 does not cause timeout of a corresponding timer at the WLAN AP 116 for responding to the third WLAN authentication message M3. After termination of the WPAN time period 418, the WLAN STA unit 122 initiates a WLAN time period 420 and transmits the fourth WLAN authentication message 308 to the WLAN AP 116 to acknowledge (ACK) receipt of the third WLAN authentication message 306 to the WLAN AP 116. During the WLAN time period 420, the WPAN unit 124 does not transmit. The WLAN STA 122 can provide an indication to the WPAN unit 124 of the start and subsequently the end of the WLAN time period 420. After transmitting the fourth WLAN authentication message 308 to the WLAN AP 116, the WLAN STA unit 122 can end the WLAN time period. With successful communication of the four WLAN authentication messages between the WLAN STA 122 and the WLAN AP 116, a WLAN connection e.g., a secure encrypted data connection, is established. In some embodiments, the WLAN AP 116 of the accessory system 110 can restrict transmissions by the WPAN unit 118 of the accessory system 110 during one or more WLAN time periods, such as any/all of WLAN time periods 406, 410, 416, 420 and/or other time periods, to reduce interference that could impact for reception of one or more WLAN authentication messages.

Figure 5:
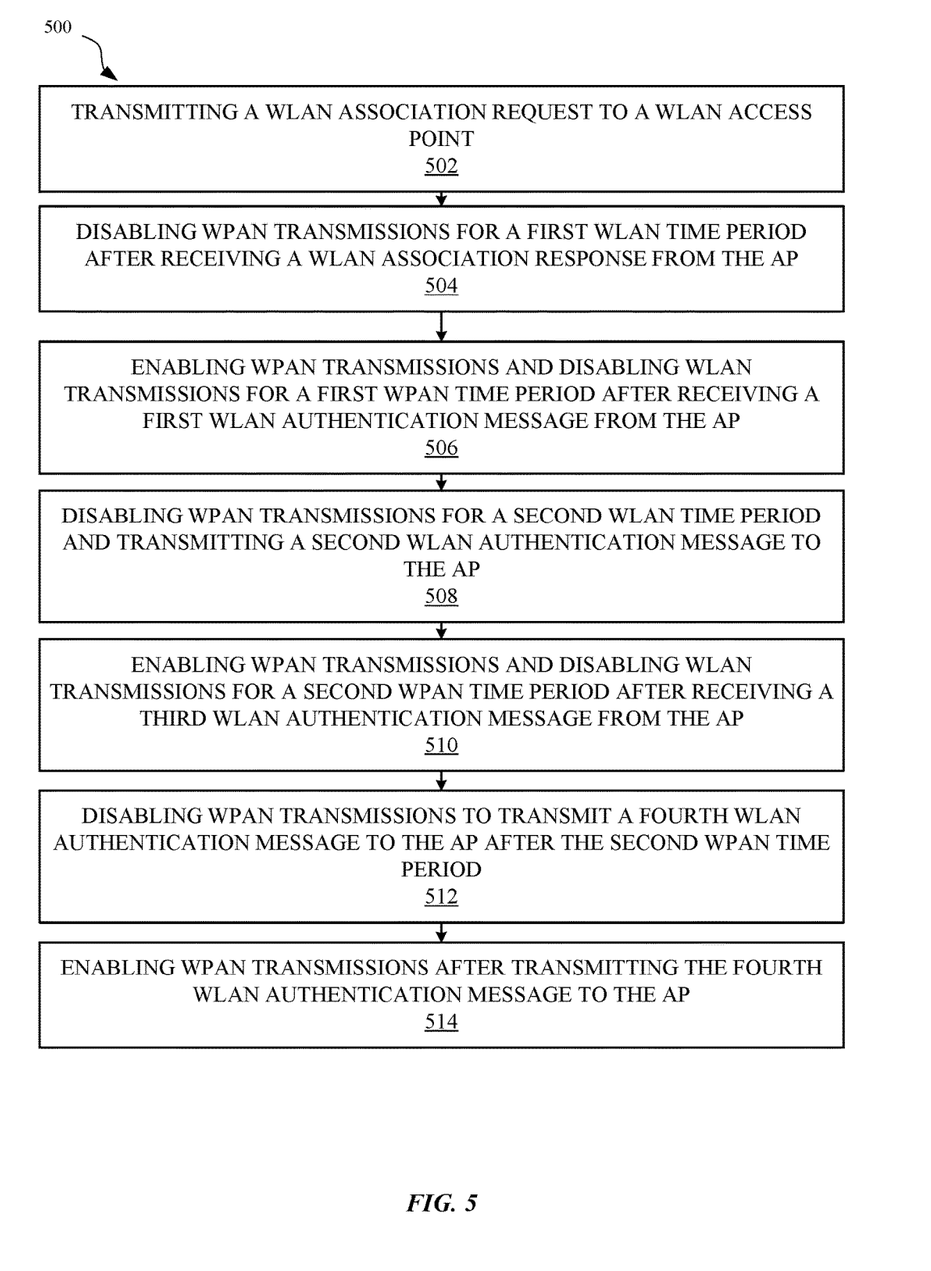
FIG. 5 illustrates a flowchart of an example method for mitigating coexistence interference during an authentication process between the user device and the accessory system, according to some embodiments.

FIG. 5 illustrates a flowchart 500 of an example method for mitigating coexistence interference during a WLAN authentication process, e.g., between the user device 120 and the accessory system 110. At 502, the WLAN STA unit 122 of the user device 120 transmits a WLAN association request to the WLAN AP unit 116 of the accessory system 110. At 504, the WPAN unit 124 disables WPAN transmissions for a first WLAN time period after receiving a WLAN association response from the WLAN AP unit 116. In some embodiments, the WLAN STA unit 122 provides an indication to the WPAN unit 124 of the start of the first WLAN time period. At 506, the WLAN STA unit 122 terminates the WLAN time period, after receiving a first WLAN authentication message (M1) from the WLAN AP unit 116, and initiates a WPAN time period during which WPAN transmissions are enabled and WLAN transmissions are disabled. In some embodiments, the duration of the WPAN time period is based at least in part on one or more active WPAN profiles in use by the WPAN unit 124 and/or an amount/importance of pending WPAN messages.

At 508, the WLAN STA unit 122 terminates the WPAN time period and initiates a second WLAN time period, during which the WLAN STA unit 122 transmits a second WLAN authentication message (M2) to the WLAN AP unit 116. The WLAN STA unit 122 can determine the duration of the WPAN time period based on an indication from the WPAN unit 124 and/or based on expiration of a timer to ensure that a time to respond to the first WLAN authentication message from the WLAN AP unit 116 with the second WLAN authentication message to the WLAN AP unit 116 does not extend beyond a timeout timer for the WLAN AP unit 116. The duration of the second WLAN time period can be based at least in part on reception of a third WLAN authentication message (M3) from the WLAN AP unit 116 or expiration of a timer associated with the reception of the third WLAN authentication message from the WLAN AP unit 116. If the third WLAN authentication message is not received from the WLAN AP unit 116 in time, e.g., based on expiration of an associated timeout timer, the WLAN AP unit 116 can terminate the second WLAN time period and initiate another WPAN time period. (Alternatively, if the third WLAN authentication message is received in time, a WPAN time period can be initiated before transmitting the M4 (ACK) message in a subsequent WLAN period.) After the another WPAN time period, the WLAN AP unit 116 can initiate another WLAN time period, retransmit the second WLAN authentication message to the WLAN AP unit 116 and await receipt of the third WLAN authentication message from the WLAN AP unit 116. This pair of WPAN and WLAN time periods can repeat up to a maximum threshold number of times for completing the association.

At 510, upon successful reception of the third WLAN authentication message from the WLAN AP unit 116, the WLAN STA unit 122 can terminate the second WLAN time period and initiate a second WPAN time period. As with the first WPAN time period, the duration of the second WPAN time period can be based at least in part on one or more active WPAN profiles in use by the WPAN unit 124, and the second WPAN time period can terminate after expiration of a timer and/or based on an indication from the WPAN unit 124. During the second WPAN time period, the WPAN unit 124 can transmit, while the WLAN STA unit 122 does not transmit.

At 512, the WLAN STA unit 122 can terminate the second WPAN time period and initiate a third WLAN time period during which the WLAN STA unit 122 transmits a fourth WLAN authentication message (M4) to the WLAN AP unit 116. As with previous WLAN time periods, the WPAN unit 124 does not transmit during the third WLAN time period. In some implementations, the third WLAN time period can be relatively brief, spanning enough time for the fourth WLAN authentication message to be received by the WLAN AP unit 116.

At 514, after termination of the third WLAN time period, a different coexistence strategy can be implemented. For example, the WLAN STA unit 122 can enable WPAN transmissions by the WPAN unit 124 and also can continue to allow WLAN transmissions by the WLAN STA unit 122, as the fourth WLAN authentication message can indicate completion of the WLAN authentication process to establish a connection between the WLAN STA unit 122 and the WLAN AP unit 116.

Figure 6:
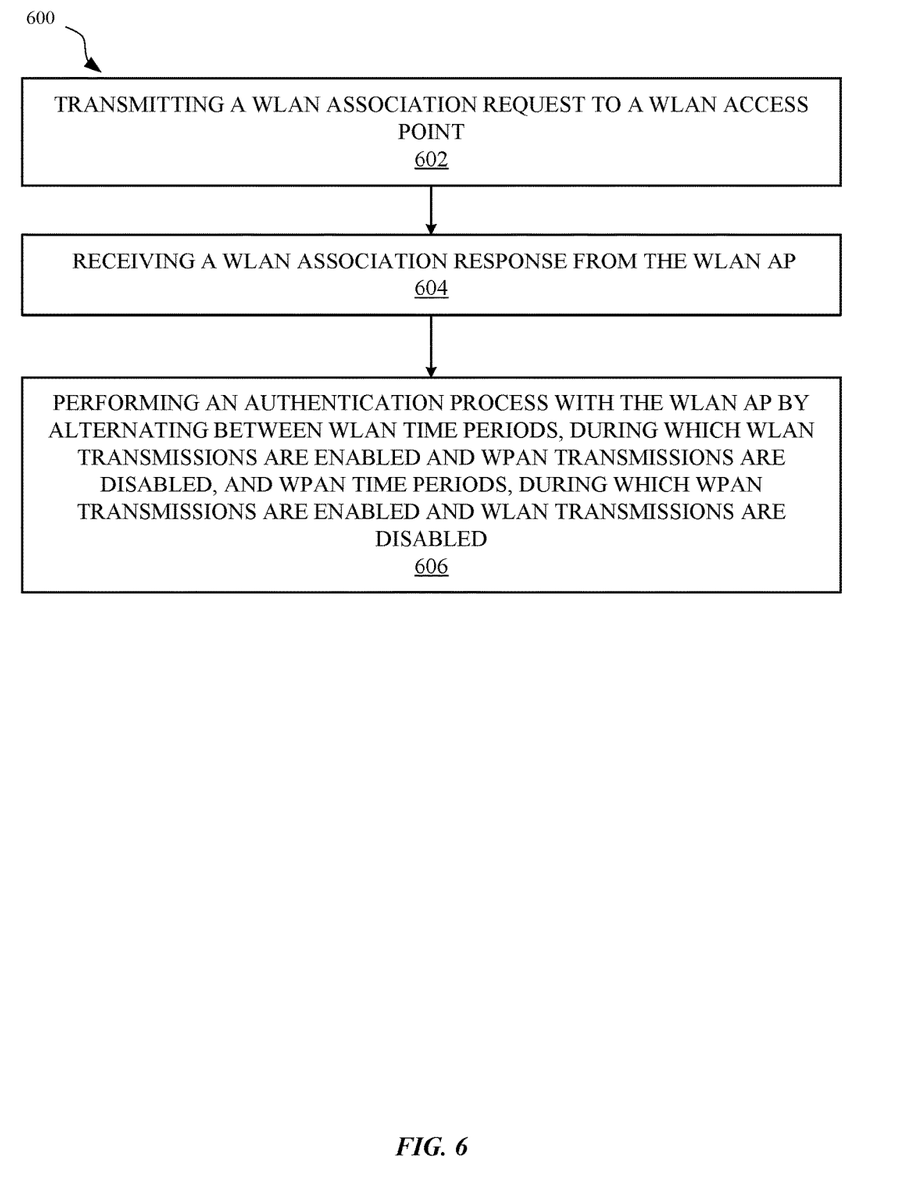
FIG. 6 illustrates a flowchart of another example method for mitigating coexistence interference during an authentication process between the user device and the accessory system, according to some embodiments.

FIG. 6 illustrates a flowchart 600 of another example method for mitigating coexistence interference during an authentication process between the user device 120 and the accessory system 110. At 602, a WLAN STA unit 122 of the user device 120 transmits a WLAN association request to a WLAN AP unit 116 of the accessory system 110. At 604, the WLAN STA unit 122 of the user device receives a WLAN association response from the WLAN AP unit 116 of the accessory system 110. At 606, the WLAN STA unit 122 of the user device performs an authentication (or association) process with the WLAN AP unit 116 by at least alternating between WLAN time periods, during which WLAN transmissions are enabled and WPAN transmissions are disabled, and WPAN time periods, during which WPAN transmissions are enabled and WLAN transmissions are disabled, until the authentication (or association) process completes successfully or times out. Durations of the WPAN time periods can be based at least in part on a WPAN profile in use by a WPAN unit 124 of the user device 120. Durations of the WLAN time periods can be based at least in part on receipt of WLAN authentication messages from the WLAN AP unit 116 of the accessory system or expiration of associated WLAN authentication process timers.

In some embodiments, the duration of a first WPAN time period of the WPAN time periods is further based at least in part on expiration of a WLAN authentication process timer. In some embodiments, the WLAN authentication process timer includes a timer for transmitting a nonce message to the WLAN AP unit 116 before occurrence of an associated timeout at the WLAN AP unit 116. In some embodiments, the duration of a first WLAN time period of the WLAN time periods is based on receipt of a nonce message from the WLAN AP unit 116. In some embodiments, the duration of a second WLAN time period of the WLAN time periods is based on receipt of an encryption key from the WLAN AP unit 116 or expiration of a timer for receipt thereof. In some embodiments, the duration of a third WLAN time period of the WLAN time periods is sufficient to transmit an acknowledgement (ACK) message to the WLAN AP unit 116 in response to receipt of the encryption key from the WLAN AP unit 116. In some embodiments, when the WPAN profile in use is a Bluetooth Asynchronous Connectionless Link (ACL) profile, the durations of the WPAN time periods is based at least in part on whether a Bluetooth connection using the ACL profile is active or idle. In some embodiments, when the WPAN profile in use is a Bluetooth Advanced Audio Distribution Profile (A2DP), the durations of the WPAN time periods is based at least in part on a time to empty pending WPAN transmission data buffers. In some embodiments, when the WPAN profile in use is one of a Synchronous Connection Oriented (SCO) profile, an extended SCO (eSCO) profile, or a low power SNIFF mode, the durations of the WPAN time periods are based at least in part on a time to complete an associated SCO, eSCO, or SNIFF action. In some embodiments, the WPAN profile is a Bluetooth Classic or Bluetooth Low Energy (BTLE) profile, and the WLAN AP unit 116 operates in accordance with an 802.11 Wi-Fi wireless communication protocol.

Figure 7:
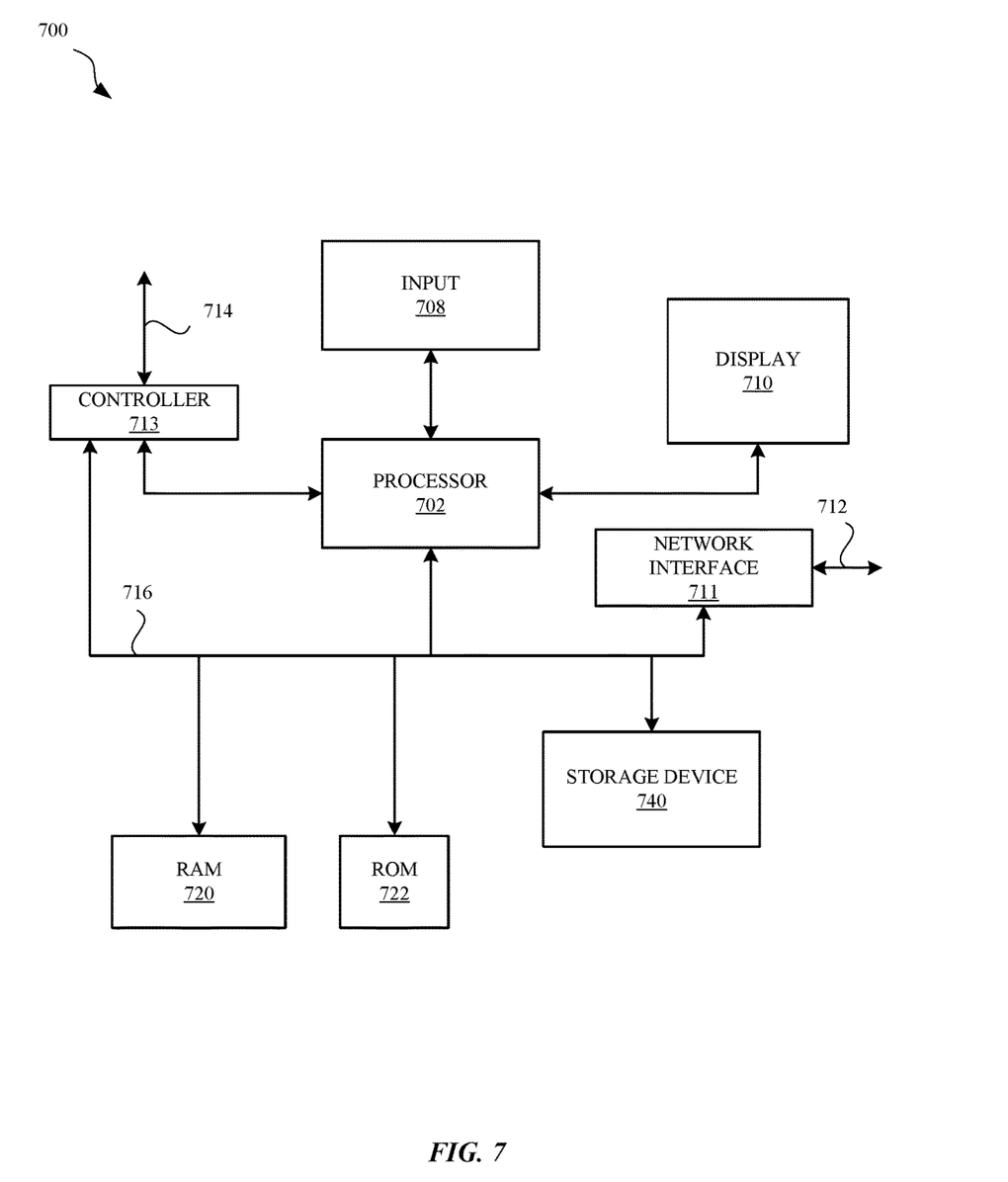
FIG. 7 illustrates a detailed view of a wireless device that can be used to implement the various techniques described herein, according to some embodiments.

FIG. 7 illustrates a detailed view of a computing device 700 that can be used to implement the various components described herein, according to some embodiments. In particular, the detailed view illustrates various components that can be included in the accessory system 110 or the user device 120 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (e.g., a screen display) that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or multiple disks (e.g., hard drives), and includes a storage management module that manages one or more partitions within the storage device 740. In some embodiments, the storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for enabling a wireless device to mitigate coexistence interference during an authentication process while establishing a wireless local area network (WLAN) connection with a WLAN access point (AP), the method comprising:
   by the wireless device:
   transmitting a WLAN association request to a WLAN AP; and
   in response to receipt of a WLAN association response from the WLAN AP and while performing the authentication process with the WLAN AP, alternating between WLAN time periods, during which WLAN transmissions are enabled and wireless personal area network (WPAN) transmissions are disabled, and WPAN time periods, during which WPAN transmissions are enabled and WLAN transmissions are disabled,
   wherein:
   durations of the WPAN time periods are based at least in part on an active WPAN profile in use for a WPAN connection between the wireless device and (a) an accessory system that includes the WLAN AP or (b) a separate accessory device,
   durations of the WLAN time periods are based at least in part on receipt of WLAN authentication messages from the WLAN AP and on expiration of WLAN authentication process timers maintained at the wireless device, when one or more expected WLAN authentication messages are not received from the WLAN AP; and
   when the active WPAN profile in use comprises a Bluetooth Asynchronous Connectionless Link (ACL) profile, the durations of the WPAN time periods are based at least in part on whether a Bluetooth connection using the ACL profile is active.

2. The method of claim 1, wherein the duration of a first WPAN time period of the WPAN time periods is further based at least in part on expiration of a WLAN authentication process timer maintained at the wireless device.

3. The method of claim 2, wherein the WLAN authentication process timer comprises a timer for transmitting a nonce message to the WLAN AP before occurrence of an associated timeout at the WLAN AP.

4. The method of claim 1, wherein the duration of a first WLAN time period of the WLAN time periods is based at least in part on receipt of a nonce message from the WLAN AP.

5. The method of claim 1, wherein the duration of a second WLAN time period of the WLAN time periods is based at least in part on receipt of an encryption key from the WLAN AP and on expiration of a timer for receipt thereof, when the encryption key is not received during the second WLAN time period.

6. The method of claim 5, wherein the duration of a third WLAN time period of the WLAN time periods is sufficiently long to transmit an acknowledgement (ACK) message to the WLAN AP in response to receipt of the encryption key from the WLAN AP.

7. The method of claim 1, wherein when the active WPAN profile in use comprises a Bluetooth Advanced Audio Distribution Profile (A2DP), the durations of the WPAN time periods are based at least in part on a time to empty one or more pending WPAN transmission data buffers.

8. The method of claim 1, wherein when the active WPAN profile in use comprises one of a Synchronous Connection Oriented (SCO) profile, an extended SCO (eSCO) profile, or a low power SNIFF mode, the durations of the WPAN time periods are based at least in part on a time to complete an associated SCO, eSCO, or SNIFF action.

9. The method of claim 1, wherein the active WPAN profile comprises a Bluetooth Classic or Bluetooth Low Energy (BTLE) profile, and the WLAN AP operates in accordance with an 802.11 Wi-Fi wireless communication protocol.

10. A wireless device configurable to mitigate coexistence interference during an authentication process while establishing a wireless local area network (WLAN) connection with a WLAN access point (AP), the wireless device comprising:
   one of more antennas;
   processing circuitry; and
   wireless circuitry communicatively coupled to the one or more antennas and to the processing circuitry;
   wherein the processing circuitry includes one or more processors and memory storing instructions that, when executed by the one or more processors, cause the wireless device to:
   transmit a WLAN association request to a WLAN AP; and
   in response to receipt of a WLAN association response from the WLAN AP and while performing the authentication process with the WLAN AP, alternate between WLAN time periods, during which WLAN transmissions are enabled and wireless personal area network (WPAN) transmissions are disabled, and WPAN time periods, during which WPAN transmissions are enabled and WLAN transmissions are disabled,
   wherein:
   durations of the WPAN time periods are based at least in part on an active WPAN profile in use for a WPAN connection between the wireless device and (a) an accessory system that includes the WLAN AP or (b) a separate accessory device,
   durations of the WLAN time periods are based at least in part on receipt of WLAN authentication messages from the WLAN AP and on expiration of WLAN authentication process timers maintained at the wireless device, when one or more expected WLAN authentication messages are not received from the WLAN AP; and when the active WPAN profile in use comprises a Bluetooth Asynchronous Connectionless Link (ACL) profile, the durations of the WPAN time periods are based at least in part on whether a Bluetooth connection using the ACL profile is active.

11. The wireless device of claim 10, wherein the duration of a first WPAN time period of the WPAN time periods is further based at least in part on expiration of a WLAN authentication process timer maintained at the wireless device.

12. The wireless device of claim 11, wherein the WLAN authentication process timer comprises a timer for transmitting a nonce message to the WLAN AP before occurrence of an associated timeout at the WLAN AP.

13. The wireless device of claim 10, wherein the duration of a first WLAN time period of the WLAN time periods is based on receipt of a nonce message from the WLAN AP.

14. The wireless device of claim 10, wherein the duration of a second WLAN time period of the WLAN time periods is based on receipt of an encryption key from the WLAN AP and on expiration of a timer for receipt thereof, when the encryption key is not received during the second WLAN time period.

15. The wireless device of claim 14, wherein the duration of a third WLAN time period of the WLAN time periods is sufficiently long to transmit an acknowledgement (ACK) message to the WLAN AP in response to receipt of the encryption key from the WLAN AP.

16. The wireless device of claim 10, wherein when the active WPAN profile in use comprises a Bluetooth Advanced Audio Distribution Profile (A2DP), the durations of the WPAN time periods are based at least in part on a time to empty one or more pending WPAN transmission data buffers.

17. The wireless device of claim 10, wherein when the active WPAN profile in use comprises one of a Synchronous Connection Oriented (SCO) profile, an extended SCO (eSCO) profile, or a low power SNIFF mode, the durations of the WPAN time periods are based at least in part on a time to complete an associated SCO, eSCO, or SNIFF action.

18. An apparatus configurable for mitigating coexistence interference during an authentication process performed by a wireless device while establishing a wireless local area network (WLAN) connection with a WLAN access point (AP), the apparatus comprising: processing circuitry, including one or more processors and memory storing instructions that, when executed by the one or more processors, cause the wireless device to:
transmit a WLAN association request to a WLAN AP; and
in response to receipt of a WLAN association response from the WLAN AP and while performing the authentication process with the WLAN AP, alternate between WLAN time periods, during which WLAN transmissions are enabled and wireless personal area network (WPAN) transmissions are disabled, and WPAN time periods, during which WPAN transmissions are enabled and WLAN transmissions are disabled,
wherein:
durations of the WPAN time periods are based at least in part on an active WPAN profile in use for a WPAN connection between the wireless device and (a) an accessory system that includes the WLAN AP or (b) a separate accessory device,
durations of the WLAN time periods are based at least in part on receipt of WLAN authentication messages from the WLAN AP and on expiration of WLAN authentication process timers maintained at the wireless device, when one or more expected WLAN authentication messages are not received from the WLAN AP; and
when the active WPAN profile in use comprises a Bluetooth Asynchronous Connectionless Link (ACL) profile, the durations of the WPAN time periods are based at least in part on whether a Bluetooth connection using the ACL profile is active.

19. The apparatus of claim 18, wherein when the active WPAN profile in use comprises a Bluetooth Advanced Audio Distribution Profile (A2DP), the durations of the WPAN time periods are based at least in part on a time to empty one or more pending WPAN transmission data buffers.

20. The apparatus of claim 18, wherein when the active WPAN profile in use comprises one of a Synchronous Connection Oriented (SCO) profile, an extended SCO (eSCO) profile, or a low power SNIFF mode, the durations of the WPAN time periods are based at least in part on a time to complete an associated SCO, eSCO, or SNIFF action.

* * * * *